US008483232B2

(12) United States Patent
Diab et al.

(10) Patent No.: US 8,483,232 B2
(45) Date of Patent: Jul. 9, 2013

(54) METHOD AND SYSTEM FOR MANAGING AN ENERGY EFFICIENT NETWORK UTILIZING AUDIO VIDEO BRIDGING

(75) Inventors: Wael William Diab, San Francisco, CA (US); Howard Frazier, Pleasanton, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 327 days.

(21) Appl. No.: 12/976,793

(22) Filed: Dec. 22, 2010

(65) Prior Publication Data
US 2011/0090914 A1 Apr. 21, 2011

Related U.S. Application Data

(63) Continuation of application No. 12/056,464, filed on Mar. 27, 2008, now Pat. No. 7,864,794.

(51) Int. Cl.
*H04L 12/28* (2006.01)
*H04L 12/56* (2006.01)

(52) U.S. Cl.
USPC .......................................................... 370/401

(58) Field of Classification Search
None
See application file for complete search history.

(56) References Cited

U.S. PATENT DOCUMENTS

| 4,475,189 A | 10/1984 | Herr et al. |
| 5,381,450 A | 1/1995 | Lane |
| 6,085,248 A | 7/2000 | Sambamurthy et al. |
| 6,192,422 B1 | 2/2001 | Daines |
| 6,442,174 B1 | 8/2002 | Lin |
| 6,587,473 B2 | 7/2003 | Terry et al. |
| 6,731,692 B1 | 5/2004 | Bhoja |
| 6,754,189 B1 | 6/2004 | Cloutier et al. |
| 6,795,450 B1 | 9/2004 | Mills et al. |

(Continued)

FOREIGN PATENT DOCUMENTS

| CN | 1291393 | 4/2001 |
| EP | 1 473 870 | 11/2004 |

(Continued)

OTHER PUBLICATIONS

Garner et al., "IEEE 802.1 AVB and Its Application in Carrier-Grade Ethernet [Standards Topics]." IEEE Communications Magazine, vol. 45, No. 12, Dec. 1, 2007.

(Continued)

*Primary Examiner* — Hassan Phillips
*Assistant Examiner* — Prenell Jones
(74) *Attorney, Agent, or Firm* — Farjami & Farjami LLP (57) ABSTRACT

Aspects of a method and system for managing an energy efficient network utilizing Audio Video Bridging are provided. Communications on an Ethernet link may be scheduled into a plurality of recurring time slots, where the scheduling comprises reserving resources of the Ethernet link utilizing the Audio Video Bridging suite of protocols. One or more occurrences of one or more of the recurring time slots may be designated for carrying out an energy efficient networking transaction on the link. The energy efficient networking transaction may be carried out during the designated one or more occurrences of the one or more of the recurring time slots. The energy efficient networking transaction may comprise communicating information for scheduling a change in the data rate on the network link. The energy efficient network transaction may comprise communicating information for implementing the change in the data rate.

24 Claims, 5 Drawing Sheets

U.S. PATENT DOCUMENTS

| | | | |
|---|---|---|---|
| 6,856,597 B1 | 2/2005 | Scott | |
| 7,298,754 B1 | 11/2007 | Miller et al. | |
| 7,864,794 B2 * | 1/2011 | Diab et al. | 370/442 |
| 2001/0033611 A1 | 10/2001 | Grimwood | |
| 2002/0136231 A1 | 9/2002 | Leatherbury | |
| 2003/0053493 A1 | 3/2003 | Graham Mobley | |
| 2003/0191854 A1 | 10/2003 | Hsu | |
| 2005/0105545 A1 | 5/2005 | Thousand et al. | |
| 2006/0034295 A1 | 2/2006 | Cherukuri et al. | |
| 2006/0140218 A1 | 6/2006 | Winterton | |
| 2006/0222155 A1 | 10/2006 | Summers et al. | |
| 2007/0014575 A1 | 1/2007 | Kramer et al. | |
| 2007/0127581 A1 | 6/2007 | Connor | |
| 2007/0263554 A1 | 11/2007 | Finn | |
| 2007/0280111 A1 | 12/2007 | Lund | |
| 2007/0280239 A1 | 12/2007 | Lund | |
| 2008/0031448 A1 | 2/2008 | Dang et al. | |
| 2008/0063000 A1 | 3/2008 | Shor et al. | |
| 2008/0112433 A1 | 5/2008 | Feng et al. | |
| 2008/0115037 A1 | 5/2008 | Effenberger | |
| 2008/0159304 A1 | 7/2008 | Ozugur et al. | |
| 2008/0201626 A1 | 8/2008 | Sturm | |
| 2008/0212591 A1 * | 9/2008 | Wu et al. | 370/395.21 |
| 2008/0225841 A1 | 9/2008 | Conway et al. | |
| 2008/0225881 A1 | 9/2008 | Powell | |
| 2008/0313508 A1 | 12/2008 | Starr | |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Kang et al., "Time Synchronization and Resource Reservation for Time-Sensitive Applications in Bridged Local Area Networks." IEEE Sixth International Conference on Advanced Language Processing and Web Information Technology, Aug. 22, 2007.

Gupta et al., "Dynamic Ethernet Link Shutdown for Energy Conservation on Ethernet Links." IEEE, Jun. 24, 2007. XP00252461.

Wael Diab, "Energy Efficient Ethernet and 802.1." Nov. 2007. XP002524617.

European Search Report corresponding to European Patent Application Serial No. 08017513.6-2416, dated Feb. 11, 2009.

Bennett et al., "Energy Efficient Ethernet", [Online] IEEE 802 Tutorial, Jul. 16, 2007, http:/www.ieee802.org/802_tutorials/july07/IEEE-tutorial-energy-efficient-ethernet.pdf.

Grow, "802.1 and Energy Efficient Ethernet", [Online] Sep. 11, 2007, pp. 1-6, http:/www.ieee802.org/3/eee_study/public/sep07/grow_1_0907.pdf.

Teener, Audio/Video Bridging for Home Networks (IEEE 802.1 AV Bridging Task Group) [Online] Jun. 2, 2007, http:/www.ieee802.org/3/eee_study/public/jul07/teener_1_0707.pdf.

Lee, Tsung-En Andy, Low Power Digital Signal Processor Architecture for Multiple Standard Wireless Communications, Ph.D. Dissertation, Dept. Electrical Engineering, Stanford University, Mar. 1998.

* cited by examiner

METHOD AND SYSTEM FOR MANAGING AN ENERGY EFFICIENT NETWORK UTILIZING AUDIO VIDEO BRIDGING

CROSS-REFERENCE TO RELATED APPLICATIONS/INCORPORATION BY REFERENCE

This patent application is a continuation of U.S. patent application Ser. No. 12/056,464 which was filed on Mar. 27, 2008, U.S. Pat. No. 7,864,794.

The above stated applications are hereby incorporated herein by reference in its entirety.

FIELD OF THE INVENTION

Certain embodiments of the invention relate to a method and system for networking. More specifically, certain embodiments of the invention relate to a method and system for managing an energy efficient network utilizing Audio Video Bridging.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing an energy efficient network utilizing Audio Video Bridging, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for managing an energy efficient network utilizing Audio Video Bridging. In this regard, an Audio Video Bridging timeslot may be designated for handling an energy efficient networking (EEN) transaction and the EEN transaction may be performed during the designated timeslot. Exemplary EEN transactions comprise scheduling a data rate transition, transitioning to a different data rate, training a link partner, and exchanging training related information. It may be determined whether the timeslot may be reserved for conveying an AVB stream prior to designating the time slot for an EEN transaction. In instances that the timeslot may be unreserved, the timeslot may be reserved for EEN transaction(s). Information exchanged during the designated timeslot may enable scheduling a data rate transition and/or training on a network link. In this regard, a subsequent timeslot may be designated for the data rate transition and/or the training.

Figure 1:
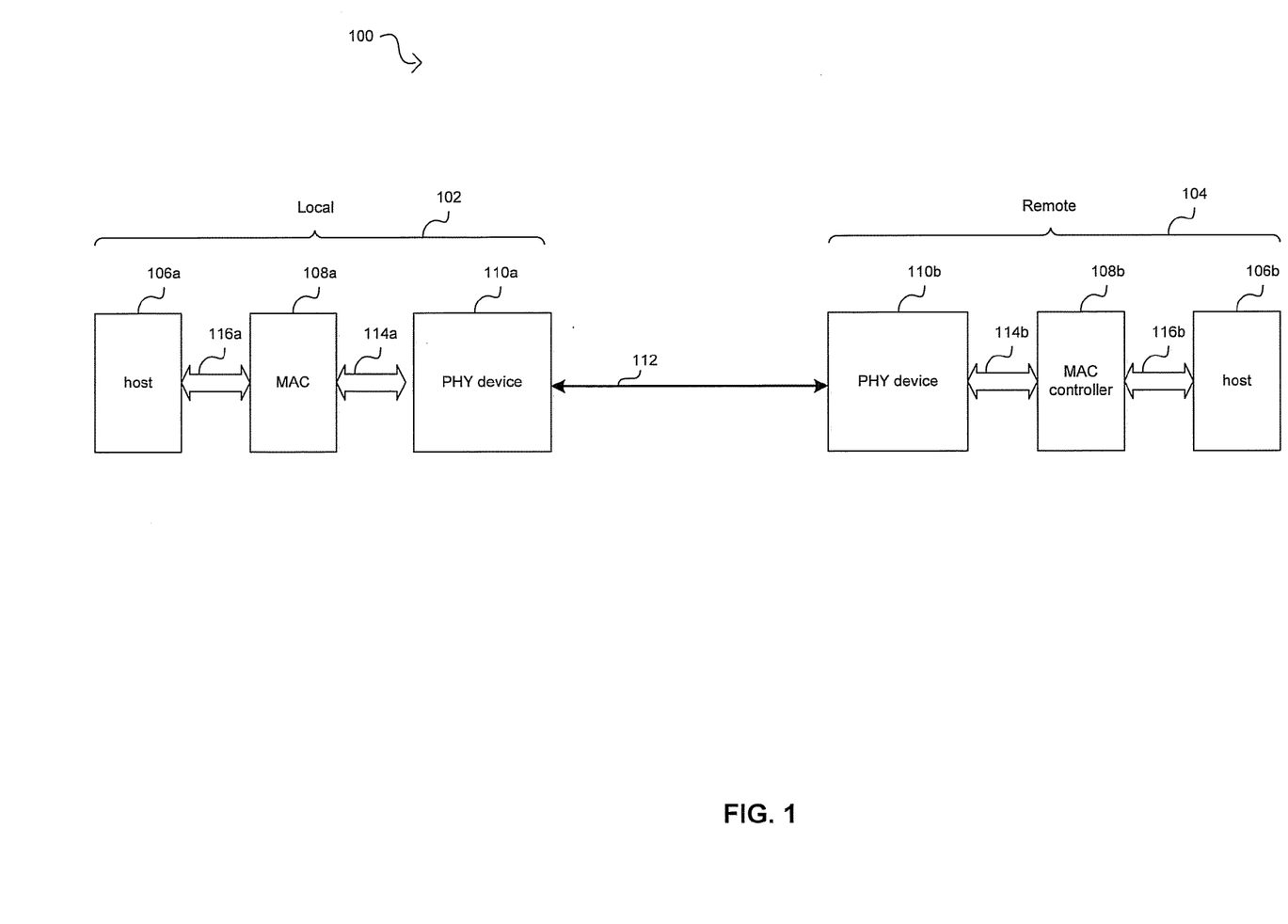
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. The cable 112 may comprise up to four or more physical channels, each of which may, for example, comprise an unshielded twisted pair (UTP). The local link partner 102 and the remote link partner 104 may communicate via two or more physical channels in the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In this regard, the link partners 102 and 104 may control an uplink data rate independent of a downlink data rate and data rate transitions may occur asymmetrically.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that, may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, controlling the data rate of the link 112 may enable the link partners 102 and 104 to communicate in a more energy efficient manner. In this regard, a low(er) data rate on the link 112 may enable reducing power consumed on the link 112 and in the link partners 102 and 104. The data rate may be controlled by, for example, controlling a number of physical channels utilized to communicate data, controlling the pulse amplitude modulation (PAM) levels used for signaling, controlling the signal constellation utilized for representing data on the link, and/or controlling the length of time between frames (the inter-frame gap). In this regard, one or more methods may be utilized on a link to achieve a maximum data rate, a zero data rate, or an intermediate data rate. In an exemplary embodiment of the invention, one or more channels of the link 112 may transmit data in bursts in between periods of inactivity. For these burst transmissions, energy efficiency of the network 100 may be improved by reducing the power required for keeping the channels trained. In this regard, power may be reduced in comparison to a conventional network which may continuously transmit conventional IDLE symbols. Accordingly, aspects of the invention may enable utilizing audio video bridging protocols and/or audio video bridging extensions (collectively referred to herein as audio video bridging or AVB) to schedule and/or coordinate data rate transitions.

In operation, when the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters and/or circuitry to account for variables such as the type of cabling over which data is being communicated and the environmental conditions (e.g. temperature) surrounding the cabling. This process of configuring one or more circuits and/or parameters in an Ethernet link partner may be referred to as "training". In this regard, "training" may adapt a link partner to current conditions so functions such as echo cancellation, far-end crosstalk cancellation, and near-end crosstalk cancellation may be performed.

Training parameters and/or circuitry may need to be periodically refreshed or updated to adapt a link partner to varying conditions. In a conventional network, a link partner coupled to a physical channel which has been inactive for a period of time may need to be "retrained" such that circuitry and/or parameters, which may become outdated over time, may be refreshed in order to provide reliable communications over the physical channel(s). However, a complete retraining of a link partner may be a length operation which may interfere with communications on the link. Accordingly, aspects of the invention may enable periodically verifying and/or updating configuration parameters and/or other training information such that a complete retraining may be unnecessary. In this regard, coordinating the verification and/or updating of circuitry and/or parameters in a link partner associated with one or more physical channels may be difficult in instances that the link partner may be actively communicating data because, for example, communications may need to be interrupted while training is coordinated and/or training information is exchanged between link partners. Accordingly, aspects of the invention may enable utilizing AVB to schedule and/or coordinate training of a link partner and/or exchange of parameters or other information between link partners. In this regard, aspects of the invention may enable designating one or more AVB timeslots during which training of a link partner, coordination of training, and/or exchange of parameters or other information pertaining to training may occur. In this manner, AVB may be utilized to enable training logic, circuitry, and/or code in a link partner without interfering with the operation of the link partner.

Figure 2:
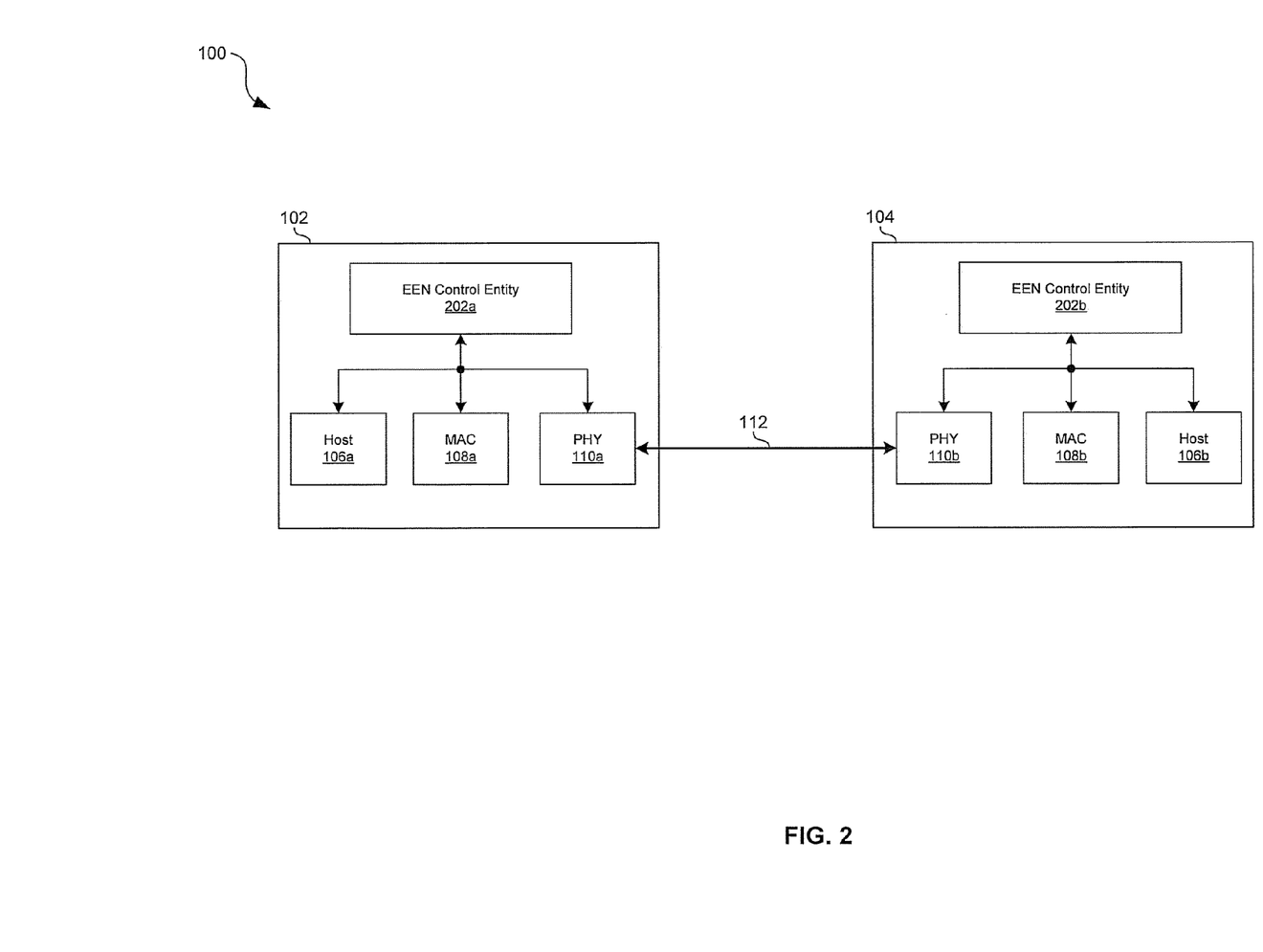
FIG. 2 is a diagram illustrating management of an energy efficient network utilizing audio video bridging, in accordance with an embodiment of the invention.

FIG. 2 is a diagram illustrating management of an energy efficient network utilizing audio video bridging, in accordance with an embodiment of the invention. Referring to FIG. 2 there is shown link partners 102 and 104 which may each comprise an energy efficient network (EEN) control entity.

The link partners 102 and 104 may be similar to or the same as described in FIG. 1.

The EEN control entities 202*a* and 202*b*, collectively referred to as entities 202, may comprise suitable logic, circuitry, and/or code that may be enabled to establish and/or implement an EEN control policy for the network 100. In this regard, the entities 202 may be a logical and/or functional block which may, for example, be implemented in portions of the hosts 106, the MACs 108, and/or the PHYs 110. The entities 202 may be enabled to analyze traffic on the physical link 112 and to analyze operations and/or processing of data in the link partners 102 and 104. In this manner, the entities 202 may exchange information from, or pertaining to, one or more layers of the OSI hierarchy in order to establish and/or implement the EEN control policy.

In various embodiments of the invention, the EEN control policy may improve energy efficiency by managing a data rate on the link 112. The control policy may determine when and how to adjust a data rate on the link 112. In this regard, the policy may utilize subset PHY techniques, low power idle techniques, FastStart, RPS, etc. for controlling the data rate. Additionally, the control policy may determine when and how to train portions of the link partners 102 and 104.

In operation, in order to implement the EEN control policy, EEN control and/or management traffic (herein referred to as EEN traffic) may need to be exchanged between the entities 202 over the link 112. In this regard, it may be desirable to exchange EEN traffic without having a significant negative impact on data communications on the link 112. Accordingly, aspects of the invention may enable utilizing audio video bridging for establishing and/or implementing the EEN control policy. In this regard, AVB may enable the entities 202 to determine one or more timeslots during which EEN traffic may be exchanged and/or during which a data rate transition may occur. For example, one or more first timeslots may be utilized for exchanging information to negotiate and/or schedule a data rate transition and one or more subsequent timeslots may be utilized for actually carrying out the data rate transition. Similarly, a first timeslot may be utilized to negotiate how and when to train one or more channels on the link 112 and the training may be performed during a subsequent timeslot.

In various embodiments of the invention, synchronization of AVB enabled network nodes may enable determining which timeslot(s) to designate for an EEE transaction, such as a data rate transition or exchange of EEN traffic. Additionally, increased network awareness as a result of AVB may enable determining which timeslot(s) to designate for an EEN transaction. For example, because AVB data streams may be registered in the link partners 102 and 104, the entities 202 may decide to adjust the data rate of the link 112 to be large enough for the registered traffic plus an additional amount for best effort traffic. Moreover, since the registered streams may be assigned to particular timeslots, the entities 202 may be enabled to determine which timeslots may be free or unused.

In an exemplary embodiment of the invention, an AVB timeslot may be 125 us. Accordingly, in instances that an EEN transaction may be performed in less than 125 us, only a single AVB timeslot may be designated for the EEN transaction. Alternatively, in instances that an EEN transaction may require longer than 125 us, multiple timeslots may be designated.

In another exemplary embodiment of the invention, an EEN transaction may be repetitive or periodic. Accordingly, an initial EEN transaction may be utilized to convey the periodic or repetitive nature of the EEE transaction, and subsequent occurrences of the transaction may simplified or require less time than the initial EEN transaction.

Figure 3A:
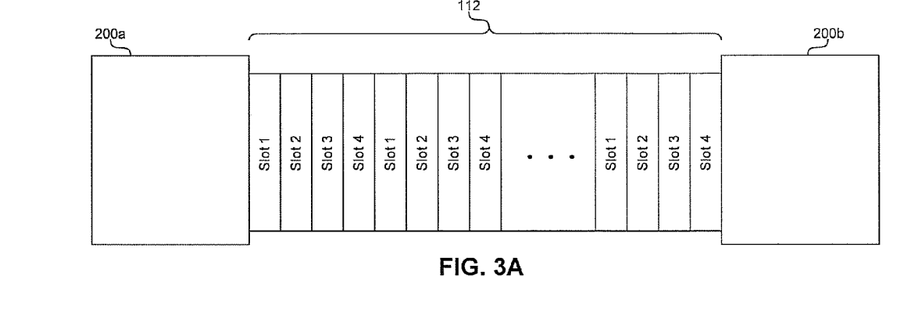
FIG. 3a is a diagram illustrating communication between two AVB enabled network nodes, in connection with an embodiment of the invention.

FIG. 3a is a diagram illustrating communication between two AVB enabled network nodes, in connection with an embodiment of the invention. Referring to FIG. 7a, communication between the link partners 200a and 200b over the link 112 may be divided into time slots. In this regard, AVB may be utilized to manage communications between the link partner 200a and 200b such that guaranteed quality of service may be provided. In the exemplary embodiment depicted, communications over the link 112 may be divided into four rotating time slots.

Figure 3B:
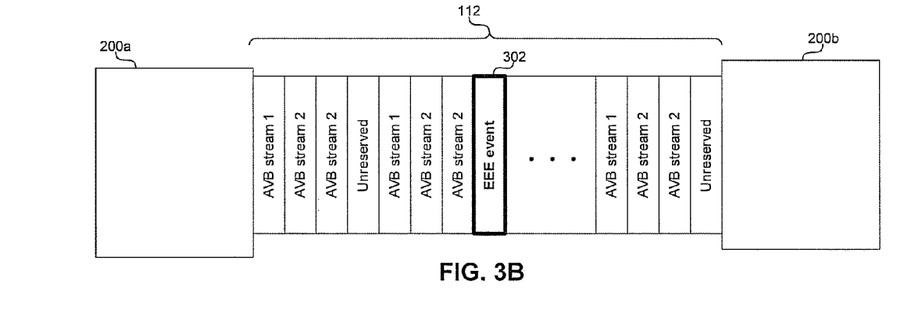
FIG. 3b is a diagram illustrating management of power consumption of a network node utilizing AVB, in accordance with an embodiment of the invention.

FIG. 3b is a diagram illustrating management of power consumption of a network node utilizing AVB, in accordance with an embodiment of the invention. In the exemplary embodiment of the invention depicted in FIG. 7b, AVB streams 1 and 2 may be registered between the link partners 200a and 200b. Accordingly, time slot 1 may be reserved for AVB stream 1 and time slots 2 and 3 may be reserved for AVB stream 2. Accordingly, data for AVB stream 1 may be transmitted during occurrences of time slot 1 and data for AVB stream 2 may be transmitted during occurrences of time slots 2 and 3. Time slot 4 may be unreserved and may be available for best effort delivery between the link partners 200a and 200b. In this regard, time slot 4 may be utilized, for example, to convey general Ethernet traffic that is not part of an AVB stream. Accordingly, aspects of the invention may enable scheduling and/or coordinating one or more EEN transactions during one or more occurrences of time slot 4. Moreover, an EEN transaction, such as a data rate transition, may be scheduled to occur during one or more occurrences of time slot 4.

In operation, the link partner 200a may desire to reduce a data rate of the link 112. Accordingly, the timeslot 302 (the second occurrence of the unreserved timeslot 4) may be designated for communicating EEN traffic. For example, the link partner 200a and/or 200b may be re-trained during the time interval 302. Similarly, during the timeslot 302, the link partners 200a and 200b may exchange messages for coordinating and/or implementing a data rate transition. Thus, EEN transactions taking place during designated timeslot 4 may prevent EEN transactions from impacting the AVB streams being communicated during timeslots 1,2 and 3.

In another exemplary embodiment of the invention, the timeslot 4 may be reserved for EEE protocols in a manner similar to or the same as how the timeslots 1-3 are reserved for AVB streams. In this regard, a necessary bandwidth for data rate management and/or exchange of training related information may be determined and a timeslot(s) of corresponding length may be reserved. In instances that an available timeslot may be designated but not reserved for EEE management, the EEE protocols may be implemented in a "best effort" manner. In instances that a recurring timeslot may be reserved for EEE management, the EEE protocols may be implemented with a guaranteed quality of service" similar to a conventional AVB stream.

In another exemplary embodiment of the invention, one or more EEN transactions may take place during one or more occurrences of the times slots 1, 2, and/or 3. For example, there may be a period of inactivity in the AVB stream 1 and an EEN transaction may take place during an occurrence of timeslot 1 corresponding to that period of inactivity. In another example, AVB stream 2 may be temporarily buffered and an EEN transaction may take place during a occurrence of time slot 3 corresponding to the buffering of the AVB stream 2.

Figure 4A:
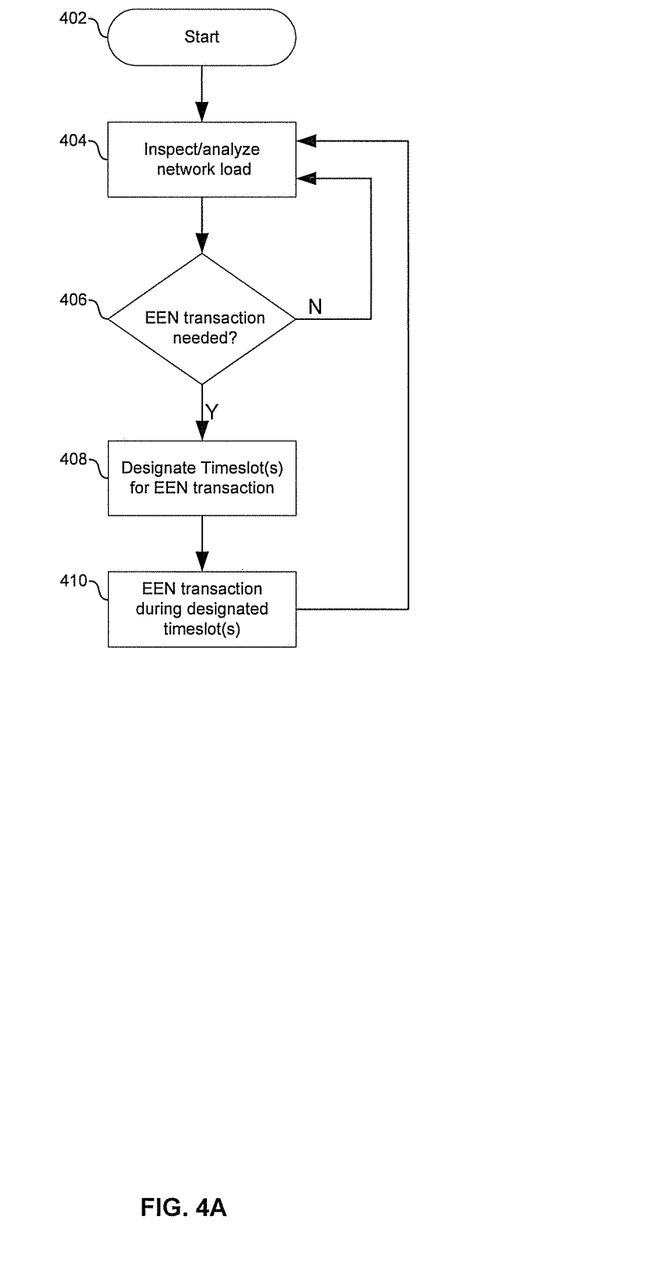
FIG. 4a is a flow chart illustrating exemplary steps for implementing an EEN control policy utilizing AVB, in accordance with an embodiment of the invention.

FIG. 4a is a flow chart illustrating exemplary steps for implementing an EEN control policy utilizing AVB, in accordance with an embodiment of the invention. Referring to FIG. 4a, subsequent to start step 402, the exemplary steps may advance to step 404. In step 404, the EEN control entities 202 (FIG. 2) may gather information by monitoring traffic on the link 112 and/or monitoring operations in their respective link partners 102 and 104. Subsequent to step 404, the exemplary steps may advance to step 406. In step 406, the entities 202 may determine whether an EEN transaction may be necessary based on the information gathered in step 404 and based on a EEN policy of the network 100. For example, the entities 202 may decide to change a data rate on the link 112 and/or may decide one or both of the link partners 102 and 104 need training. In instances that an EEN transaction may be determined to be unnecessary, the steps may return to step 404.

Returning to step 406, in instances that an EEN transaction may be necessary, the exemplary steps may advance to step 408. In step 408, one or more AVB timeslots during which the EEN transaction may occur may be designated. Subsequent to step 408, the exemplary steps may advance to step 410. In step 410, the EEN transaction may take place during the designated timeslot(s). Subsequent to step 410, the exemplary steps may return to step 406.

Figure 4B:
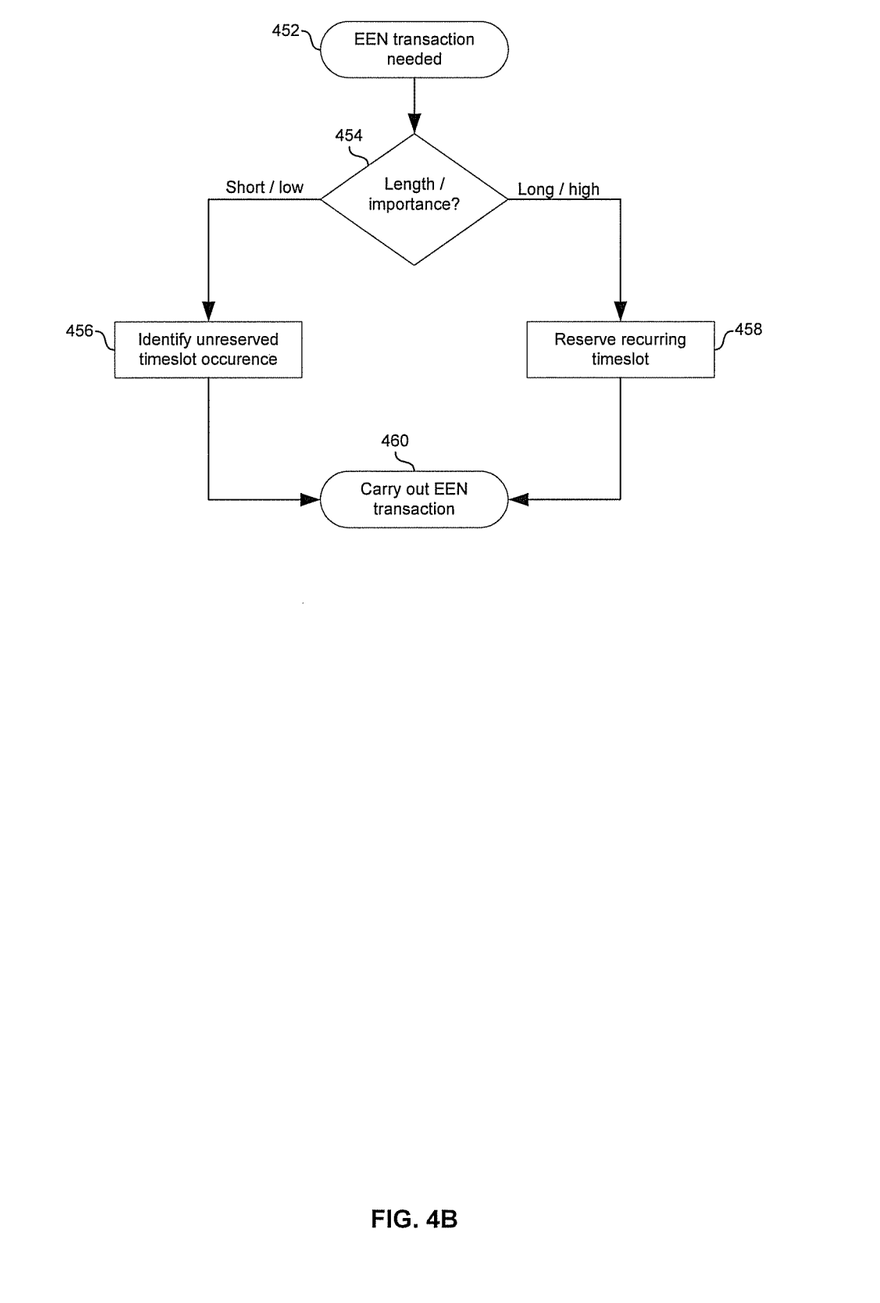
FIG. 4b is a flowchart illustrating exemplary steps for implementing energy efficient networking protocols during an AVB timeslot, in accordance with an embodiment of the invention.

FIG. 4b is a flowchart illustrating exemplary steps for implementing energy efficient networking protocols during an AVB timeslot, in accordance with an embodiment of the invention. The exemplary steps may begin with step 452 when one or more EEN entities, based on an EEN control policy, determine that an EEN transaction may need to occur. Subsequent to step 452, the exemplary steps may advance to step 454. In step 454, the length and/or importance of the EEN transaction may be determined. In instances that the EEN transaction may take longer than one AVB timeslot, or in instances that the EEN transaction may be of high importance, the exemplary steps may advance to step 458. In step 408, an AVB timeslot may be reserved for the EEN transaction. In this regard, the timeslot may be reserved in a manner similar to or the same as a timeslot being reserved for communication of a multimedia data steam. Subsequent to step 458, the exemplary steps may advance to step 460. In step 460, the EEN transaction may occur during one or more occurrences of the reserved timeslot.

Returning to step 454, in instances that an amount of time required for the EEN transaction may be shorter than an AVB timeslot, or in instances that the EEN transaction may be of low importance, the exemplary steps may advance to step 456. In step 456, an unused timeslot may be identified and may be designated to be utilized for the EEN transaction. In this regard, the timeslot may, for example, be an unreserved timeslot or may be an unused occurrence of a reserved timeslot. Subsequent to step 456, the exemplary steps may advance to step 460. In step 460 the EEN transaction may occur during the designated timeslot.

Aspects of a method and system for management of power consumption of a network node utilizing AVB are provided. In this regard, an Audio Video Bridging timeslot, such as the timeslot 4 of FIGS. 4A and 4B, may be designated for handling an energy efficient networking (EEN) transaction and the EEN transaction may be performed during the designated timeslot. Exemplary EEN transactions comprise scheduling a data rate transition, transitioning to a different data rate, training a link partner, and exchanging training related information. It may be determined whether the timeslot may be reserved for conveying an AVB stream prior, such as the reserved time slots 1 and 2 of FIG. 4B, to designating the time slot for an EEN transaction. If unreserved, the timeslot may be reserved for EEN transaction(s). Information exchanged during the designated timeslot may enable scheduling a data rate transition and/or training on a network link, such as the link 112. In this regard, a subsequent timeslot may be designated for the data rate transition or the training.

Another embodiment of the invention may provide a machine-readable storage, having stored thereon, a computer program having at least one code section executable by a machine, thereby causing the machine to perform the steps as described herein for low reducing transceiver power via a variable number of channels.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   scheduling communications on an Ethernet link into a plurality of recurring time slots, where said scheduling comprises reserving resources of said Ethernet link utilizing an Audio Video Bridging suite of protocols;
   designating one or more occurrences of one or more of said recurring time slots for carrying out an energy efficient networking transaction on said link; and
   performing said energy efficient networking transaction during said designated one or more occurrences of said one or more of said recurring time slots.

2. The method according to claim 1, wherein said energy efficient networking transaction comprises:
   communicating information for scheduling a change in a data rate on said network link; and
   communicating information for implementing said change in said data rate.

3. The method according to claim 2, wherein said change in said data rate comprises a change to or from a zero data rate.

4. The method according to claim 2, wherein:
   said information for scheduling a change in the data rate on said network link is communicated during a first designated occurrence of said one or more of said recurring time slots; and
   said information for implementing said change in said data rate is communicated during a second designated occurrence of said one or more of said recurring time slots.

5. The method according to claim 2, wherein said change in said data rate is accomplished by one or more of:
   a change in how many channels of said network link are active;
   a change in a signal constellation utilized to represent data on said network link;
   a change in how many voltage levels are utilized for signaling on said network link; and
   a change in a duration of one or more inter-frame gaps transmitted on said network link.

6. The method according to claim 1, wherein said energy efficient networking transaction comprises:
   communicating information for scheduling training of one or more channels of said network link; and
   communicating signals for training said one or more channels.

7. The method according to-claim 6, wherein:
   said information for scheduling said training is communicated during a first designated occurrence of said one or more of said recurring time slots; and
   said signals for training are communicated during a second designated occurrence of said one or more of said recurring time slots.

8. The method according to claim 1, comprising:
   prior to said designating, determining that said designated one or more occurrences of said one or more of said recurring timeslots are not needed for timely communication of data via said network link.

9. The method according to claim 1, comprising designating every occurrence of said one of said recurring time slots for carrying out energy efficient transactions on said link.

10. The method according to claim 1, wherein said Ethernet link comprises twisted-pair copper cabling.

11. The method according to claim 1, wherein said Ethernet link comprises optical fiber.

12. The method according to claim 1, wherein said energy efficient networking transaction comprises transitioning into or out of a low power idle mode of operation.

13. A system for networking, the system comprising:
   one or more circuits for use in an Ethernet device, said one or more circuits being operable to:
      schedule communications on an Ethernet link into a plurality of recurring time slots, where said scheduling comprises reserving resources of said Ethernet link utilizing an Audio Video Bridging suite of protocols;
      designate one or more occurrences of one or more of said recurring time slots for carrying out an energy efficient networking transaction on said link; and
      perform said energy efficient networking transaction during said designated one or more occurrences of said one or more of said recurring time slots.

14. The system according to claim 13, wherein said energy efficient networking transaction comprises:
   communicate information for scheduling a change in a data rate on said network link; and communicate information for implementing said change in said data rate.

15. The system according to claim 14, wherein said change in said data rate comprises a change to or from a zero data rate.

16. The system according to claim 14, wherein:
said information for scheduling a change in the data rate on said network link is communicated during a first designated occurrence of said one or more of said recurring time slots; and
said information for implementing said change in said data rate is communicated during a second designated occurrence of said one or more of said recurring time slots.

17. The system according to claim 14, wherein said change in said data rate is accomplished by one or more of:
a change in how many channels of said network link are active;
a change in a signal constellation utilized to represent data on said network link;
a change in how many voltage levels are utilized for signaling on said network link; and
a change in a duration of one or more inter-frame gaps transmitted on said network link.

18. The system according to claim 13, wherein said energy efficient networking transaction comprises:
communicating information for scheduling training of one or more channels of said network link; and
communicating signals for training said one or more channels.

19. The system according to claim 18, wherein:
said information for scheduling said training is communicated during a first designated occurrence of said one or more of said recurring time slots; and
said signals for training are communicated during a second designated occurrence of said one or more of said recurring time slots.

20. The system according to claim 13, wherein said one or more circuits are operable to, prior to said designation, determine that said designated one or more occurrences of said one or more of said recurring timeslots are not needed for timely communication of data via said network link.

21. The system according to claim 13, wherein said one or more circuits are operable to designate every occurrence of said one of said recurring time slots for carrying out energy efficient transactions on said link.

22. The system according to claim 13, wherein said Ethernet link comprises twisted-pair copper cabling.

23. The system according to claim 13, wherein said Ethernet link comprises optical fiber.

24. The system according to claim 13, wherein said energy efficient networking transaction comprises transitioning into or out of a low power idle mode of operation.

* * * * *